(12) United States Patent
Zhang et al.

(10) Patent No.: US 9,813,157 B2
(45) Date of Patent: Nov. 7, 2017

(54) MITIGATION OF MULTI-PATH INTERFERENCE FROM QUASI-SINGLE-MODE FIBER USING HYBRID SPAN CONFIGURATION AND DIGITAL SIGNAL PROCESSING

(71) Applicant: NEC Laboratories America, Inc., Princeton, NJ (US)

(72) Inventors: Shaoling Zhang, Princeton, NJ (US); Fatih Yaman, Monmouth Junction, NJ (US); Yue-Kai Huang, Princeton, NJ (US); Ezra Ip, Plainsboro, NJ (US); Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/062,179

(22) Filed: Mar. 6, 2016

(65) Prior Publication Data
US 2016/0261344 A1    Sep. 8, 2016

Related U.S. Application Data

(60) Provisional application No. 62/129,158, filed on Mar. 6, 2015.

(51) Int. Cl.
*H04B 10/00* (2013.01)
*H04B 10/2581* (2013.01)
*H04L 25/03* (2006.01)
*H04B 10/2543* (2013.01)
*H04B 10/69* (2013.01)

(52) U.S. Cl.
CPC ..... *H04B 10/2581* (2013.01); *H04B 10/2543* (2013.01); *H04B 10/6971* (2013.01); *H04L 25/03885* (2013.01)

(58) Field of Classification Search
CPC .. G02B 1/048; G02B 6/02395; G02B 6/3887; G02B 6/4402; H04B 10/2581; H04B 10/25073; H04B 10/2543
USPC .......................................................... 398/158
See application file for complete search history.

(56) References Cited

U.S. PATENT DOCUMENTS

| | | | |
|---|---|---|---|
| 8,467,650 B2 * | 6/2013 | Overton | C03C 25/106 385/100 |
| 2008/0124028 A1 | 5/2008 | Bickham et al. | |
| 2013/0071115 A1 | 3/2013 | Bennett et al. | |
| 2016/0091660 A1 * | 3/2016 | Li | G02B 6/02019 398/143 |

(Continued)

*Primary Examiner* — Don N Vo
(74) *Attorney, Agent, or Firm* — Joseph Kolodka

(57) ABSTRACT

Aspects of the present disclosure are directed to the mitigation of multi-path interference from quasi-single-mode fiber using hybrid span configuration and digital signal processing wherein a hybrid span of quasi-single mode fibers and single-mode fibers are used to configure the hybrid span. Additional aspects are directed to introducing a low-baud rate sub-banding signal to reduce the number of DD-LMS taps required when compensating the multi-path interference as the low-baud rate signal requires fewer taps to cover a given range of MPI as compared to a high-baud rate signal. Finally further aspects are directed to an ALMS equalizer which further reduces the number of equalizer taps by shifting its center tap towards the right if higher-order modes transmit slower than a fundamental mode, otherwise the center tap is shifted to the left.

2 Claims, 22 Drawing Sheets

(56) References Cited

U.S. PATENT DOCUMENTS

2016/0154175 A1\* 6/2016 Downie ............. G02B 6/02019
398/144

\* cited by examiner

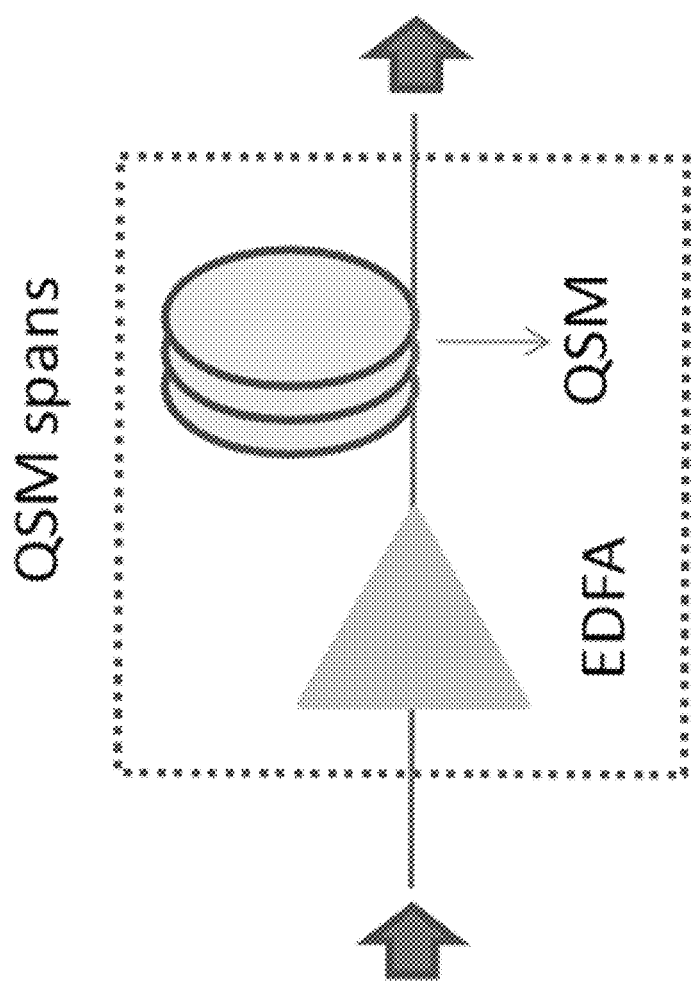

MITIGATION OF MULTI-PATH INTERFERENCE FROM QUASI-SINGLE-MODE FIBER USING HYBRID SPAN CONFIGURATION AND DIGITAL SIGNAL PROCESSING

CROSS REFERENCE TO RELATED APPLICATIONS

This application claims the benefit of U.S. Provisional Patent Application Ser. No. 62/129,158 filed Mar. 6, 2015 the entire contents of which are incorporated by reference as if set forth at length herein.

TECHNICAL FIELD

This disclosure relates generally to optical communications and in particular to systems, methods and apparatus for mitigating multi-path interference associated with single-mode optical fiber.

BACKGROUND

As is known, long-haul optical fiber transmission systems play an important role in contemporary global communications. Key components of such systems include optical fibers in which characteristic fiber nonlinearity limits performance of signals traversing therein.

Accordingly systems, methods and apparatus that mitigate the effects of such nonlinearity would represent an advance in the art.

SUMMARY

The above problems are solved and an advance is made in the art according to an aspect of the present disclosure directed to improved optical fiber transmission and more particularly the mitigation of multi-path interference (MPI) of quasi-single-mode fiber (QSM).

Viewed from a first aspect, the present disclosure is directed to systems, methods and apparatus in which QSM fiber introduces MPI into signals traversing an optical link thereby resulting in a lower nonlinearity penalty. Since signal power drops along the link, each span of the link is configured into two types of fibers namely QSM fiber and single-mode fiber (SMF). Advantageously, MPI introduced by the QSM fiber may be reduced as compared to a link of QSM fiber over the same distance.

Additionally, low-baud rate sub-banding signal is introduced to reduce the number of DD-LMS taps required when compensating the MPI. As will be appreciated, with the same amount of MPI, the low-baud rate signal requires fewer taps to cover a given range of MPI as compared to a high-baud rate signal.

Finally, an ALMS equalizer is described which further reduces the number of equalizer taps and improves performance for the same number of taps. As will become apparent, after the design of QSM fiber, the DMGD is fixed such that the speed of a higher-order mode can be known by a receiver. The ALMS equalizer "shifts" its center tap towards the right if the higher-order mode transmits slower than a fundamental mode. Otherwise the center tap is shifted to the left. As a result, the number of equalizer taps employed can advantageously be reduced by at least ⅓ compared to standard DD-LMS equalizer.

As will become apparent to those skilled in the art, systems, methods and apparatus according to the present disclosure address the MPI of QSM fiber from at least three different perspectives. First, the hybrid span of QSM and SMF fibers reduce the accumulation of MPI while keeping low any nonlinearity penalty. With such a configuration, the signal performance is significantly improved as compared to arrangements employing all QSM/SMF fiber. Additionally, the introduction of sub-banding and the ALMS equalizer further mitigates MPI from the QSM fiber within ~50 ns DMGD by using fewer equalizer taps, which advantageously reduces the complexity of a digital signal processing (DSP) algorithm. Lastly, the fewer number of equalizer taps helps stabilize the performance of the equalizer which—as those skilled in the art will appreciate—is subjected to the impact of phase noise and decision errors propagation This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which:

FIG. 1(c) shows a schematic diagram depicting a configuration having all QSM spans for comparison according to an aspect of the present disclosure;

Figure 1A:
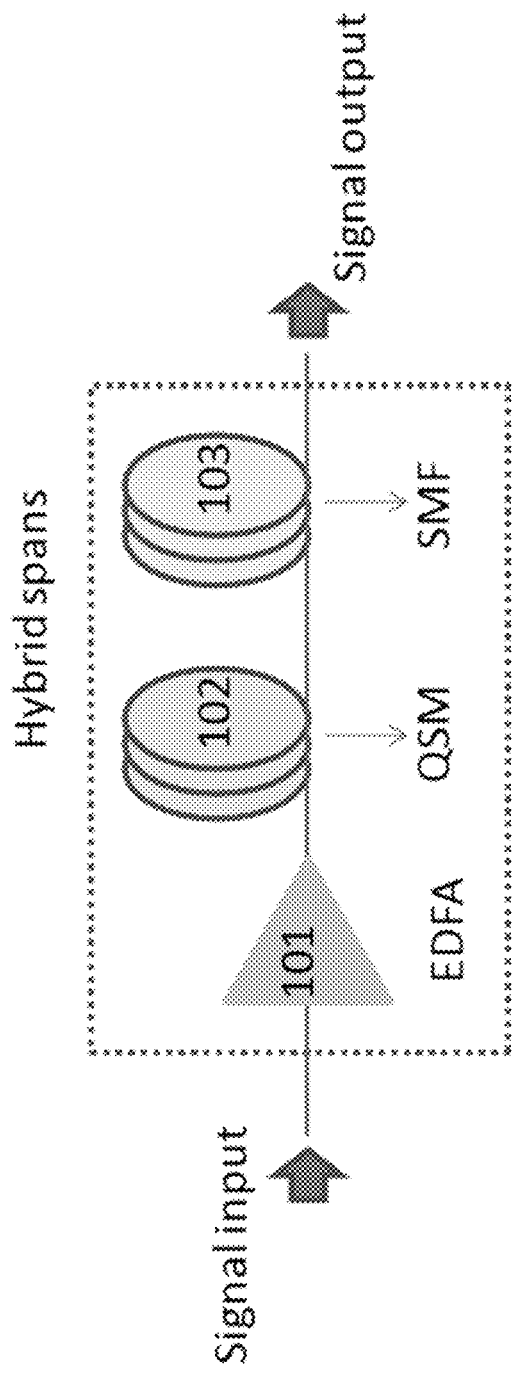
FIG. 1(a) shows schematic diagram depicting QSM/SMF span configuration according to an aspect of the present disclosure.

The illustrative embodiments are described more fully by the Figures and detailed description. Inventions according to this disclosure may, however, be embodied in various forms and are not limited to specific or illustrative embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGURES are not drawn to scale.

We now provide some non-limiting, illustrative examples that illustrate several operational aspects of various arrangements and alternative embodiments of the present disclosure. Before that discussion however, we note by way of further background that a decision-directed least-mean square (DD-LMS) equalizer has been proposed in by S. Qi, Z. HongYu, J. D. Downie, W. A. Wood, J. E. Hurley, S. Mishra, A. P. T. Lau, C. Lu, H. Tam, and P. A. Wai, in a paper entitled "256 Gb/s PM16-QAM Quasi-Single-Mode Transmission over 2600 km using Few-Mode Fiber with Multi-Path Interference Compensation," which was presented at the Optical Fiber Communication Conference, OSA Technical Digest (online) (Optical Society of America, 2014), paper M3C.5. That equalizer was proposed to compensate the MPI of QSM fiber at the cost of 500 to 2000 equalizer taps. As is known, one principle of operation of DD-LMS relies on a delayed/faster copy of signals which transmits faster/slower than the fundamental mode. Accordingly, the speed of higher-order mode depends on the fiber design. Additionally, the number of DD-LMS equalizer taps must match the differential mode group delay (DMGD) such that the MPI can be fully compensated and the DMGD could be as long as 100 ns after single 100 km QSM fiber.

In contrast, according to the present disclosure and as will become apparent to the reader, the approach(es) described herein may be viewed in three aspects namely:

1) QSM fiber introduces MPI to optical signals while imparting a lower nonlinearity penalty. Since signal power dropping as signals progress along an optical link or span, each span is configured with two kinds of fibers namely, QSM fiber+SMF. In this manner, any MPI introduced by the QSM fiber may be reduced by half as compared to a span having all QSM fiber over an equivalent distance.

2) Low-baud rate sub-banding signal is introduced to reduce the number of DD-LMS taps when compensating the MPI. Notably, with the same amount of MPI, the low-baud rate signal requires less number of taps to cover the range of MPI as compared to high-baud rate signal.

3) ALMS equalizer is employed to further reduce the number of equalizer taps and improve performance. Operationally, after the design of QSM fiber, the DMGD has already been fixed such that the speed of higher-order mode can be known by the receiver. The ALMS equalizer shifts its center tap towards the right if the higher-order mode transmits slower than fundamental mode. Else, the center taps are shifted to the left. As a result, the number of equalizers is reduced by at least ⅓ as compared to standard DD-LMS equalizer Turning now to FIG. 1(a) there is shown a schematic of an illustrative example configuration of a hybrid QSM/SMF span according to the present disclosure which reduces accumulated MPI in the signal output. As depicted therein, a signal input is first amplified to a desired power level via an erbium doped fiber amplifier (EDFA) (101) to ensure that sufficient signal power is received by a next EDFA (not specifically shown in the Figure) without incurring excessive amplified spontaneous emission (ASE) noise. For comparison, FIG. 1(b) shows schematic diagram depicting a configuration having all SMF spans for comparison with systems configured according to an aspect of the present disclosure while FIG. 1(c) shows a schematic diagram depicting a configuration having all QSM spans for comparison with systems configured according to an aspect of the present disclosure.

Figure 2A:
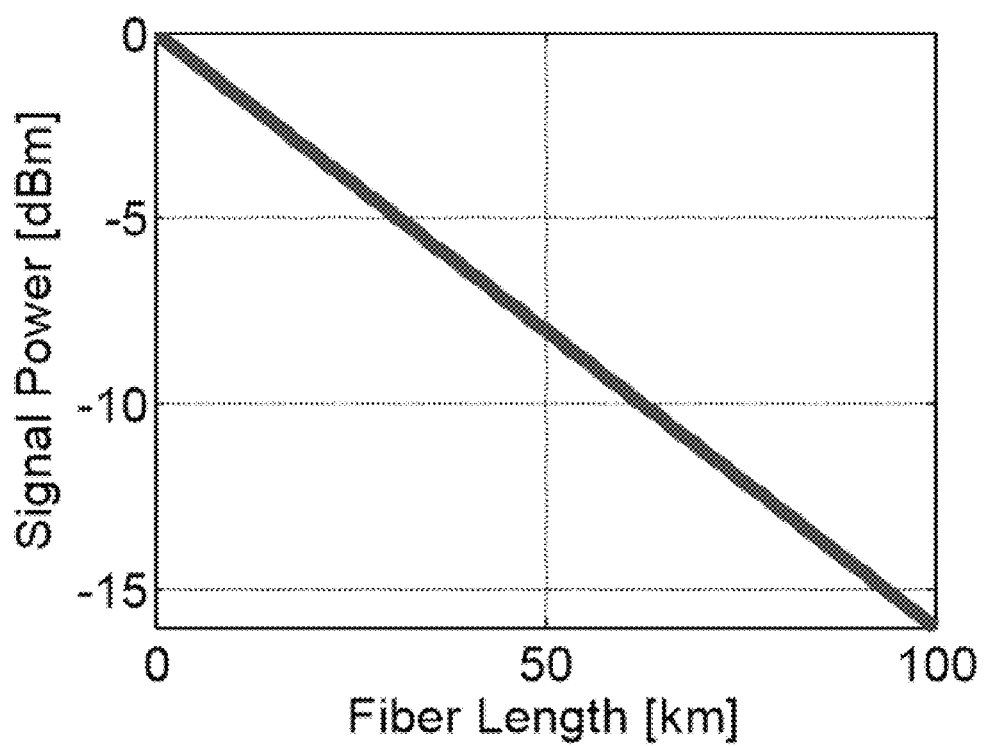
FIG. 2(a) shows a plot depicting signal power profile in each span.

Due to the fiber attenuation, the power profile of the signal will behave as shown in FIG. 2(a). Additionally, the signal will experience more fiber nonlinearity at the beginning of each fiber span because fiber nonlinearity is higher for higher signal power.

Figure 1B:
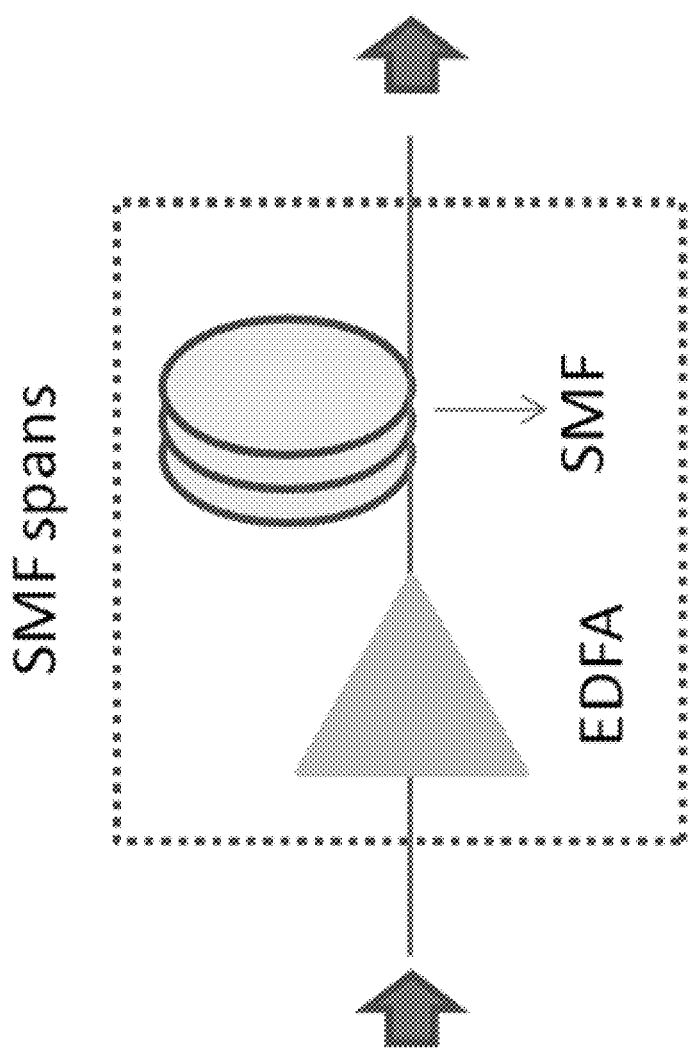
FIG. 1(b) shows schematic diagram depicting a configuration having all SMF spans for comparison according to an aspect of the present disclosure.

In a hybrid span configuration according to the present disclosure and shown schematically in FIG. 1(a), QSM fiber (102) is positioned at the beginning of a span thereby reducing the nonlinearity penalty of the signal since QSM fiber has larger effective area than SMF.

Figure 2B:
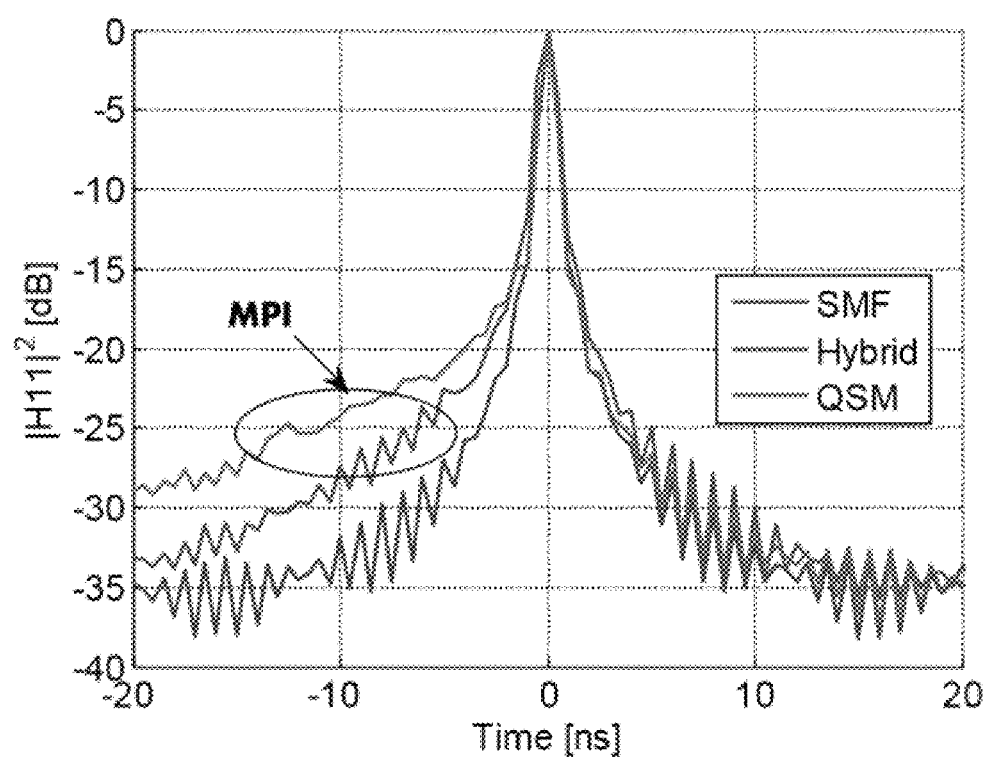
FIG. 2(b) shows a plot depicting MPI of the signal after 20 spans of QSM, SMF and hybrid spans according to an aspect of the present disclosure.

Unfortunately, QSM fiber introduces MPI into the signal, as shown graphically in FIG. 2(b) due—in part—to a differential mode group delay (DMGD) between the fundamental mode and higher-order mode. As may now be apparent to those skilled in the art—without a proper approach to address the MPI of QSM fiber—the benefits of larger effective area of QSM fiber could be negated by the strong MPI.

Accordingly, and according to an aspect of the present disclosure, SMF fiber (103) is cascaded with QSM fiber in each span is to reduce the amount of MPI. As shown in FIG. 2(b), such a cascaded, hybrid span may advantageously reduce the MPI by half due to the shorter QSM fiber length relative to the overall length of the QSM span configuration.

Figure 3:
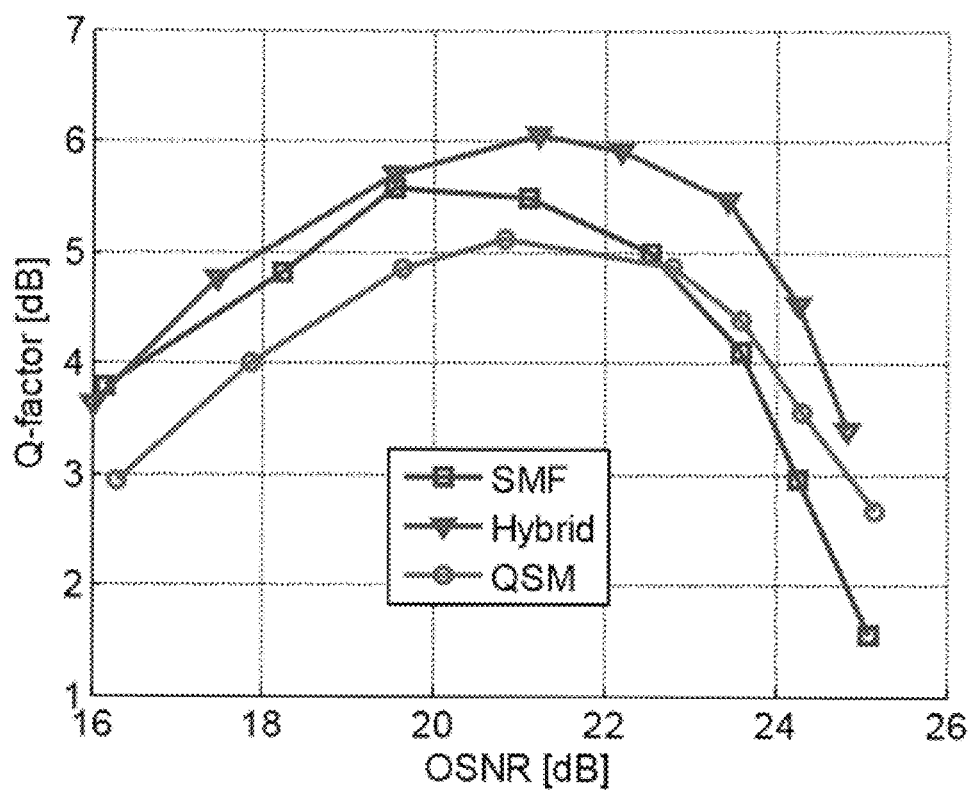
FIG. 3 shows a plot depicting performance comparisons between SMF, Hybrid and QSM span configurations according to an aspect of the present disclosure.

With reference now to FIG. 3, it may it may be observed by inspecting the graph depicted therein a benefit of the hybrid QSM/SMF span according to the present disclosure for signal performance after 4000 km transmission. As depicted in that FIG. 3—even after MPI compensation using a DSP algorithm—QSM still suffers more MPI penalty in the linear regime, and eventually has higher optimum channel power than SMF spans because of its larger effective area. In sharp contrast, a hybrid span according to the present disclosure does not exhibit as large a penalty from MPI after DSP compensation, while it still enjoys the benefits of larger effective area of QSM to launch higher optimum channel power than all SMF span. Advantageously, an evaluation of a system according to the present disclosure shows that a hybrid system according to the present disclosure outperforms SMF by about 0.5 dB.

With these structural concepts and configurations in place, we note that for the 2nd aspect to the present disclosure, a low-baud-rate signal is used to thereby enhance the improvement of MPI compensation compared to high-baud-rate signal.

As can be seen by inspection of FIG. 2(b), the "tail" of MPI can extend as long as ~20 ns where its power is still above −30 dB after 4000 km transmission. If we use 32 Gbaud signal for transmission, it requires about 1200 taps for LMS or 2400 taps for constant modulus algorithm (CMA) to compensate the strong MPI distortions. However, the long tap LMS/CMA won't be stable due to error propagation and phase tracking. On the contrary, it only needs about 50-tap LMS or 100-tap CMA equalizers to deal with this strong MPI if the signal baud reduces to 1 Gbaud.

Figure 4:
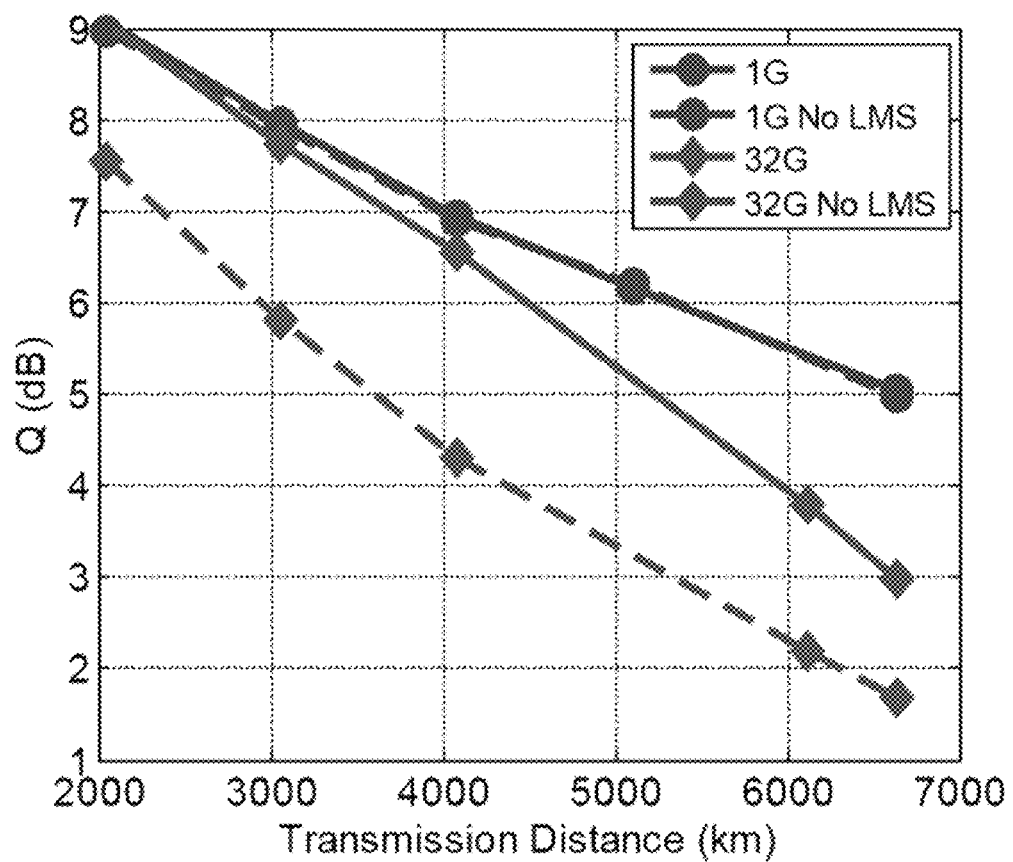
FIG. 4 shows a plot depicting performance of 32 Gbaud and 1 Gbaud signal with and without LMS at different distances wherein CMA taps: 41 taps (32 Gbaud) and 101 taps (1 Gbaud); LMS taps 1001 taps (32 Gbaud) and 101 taps (1 Gbaud) according to an aspect of the present disclosure.

Turning now to FIG. 4, it may be observed that when the MPI is moderate at shorter distance (<4000 km), the performance of a 32 Gbaud signal can be improved by a 1001-tap LMS such that a similar performance as a 1 Gbaud signal is achieved. However, the performance drops significantly after 4000 km even when applying an LMS equalizer, which has about 2 dB penalty as compared to 1 Gbaud signal and only carries 1/32 of the data of 32 Gbaud data rate.

Figure 5:
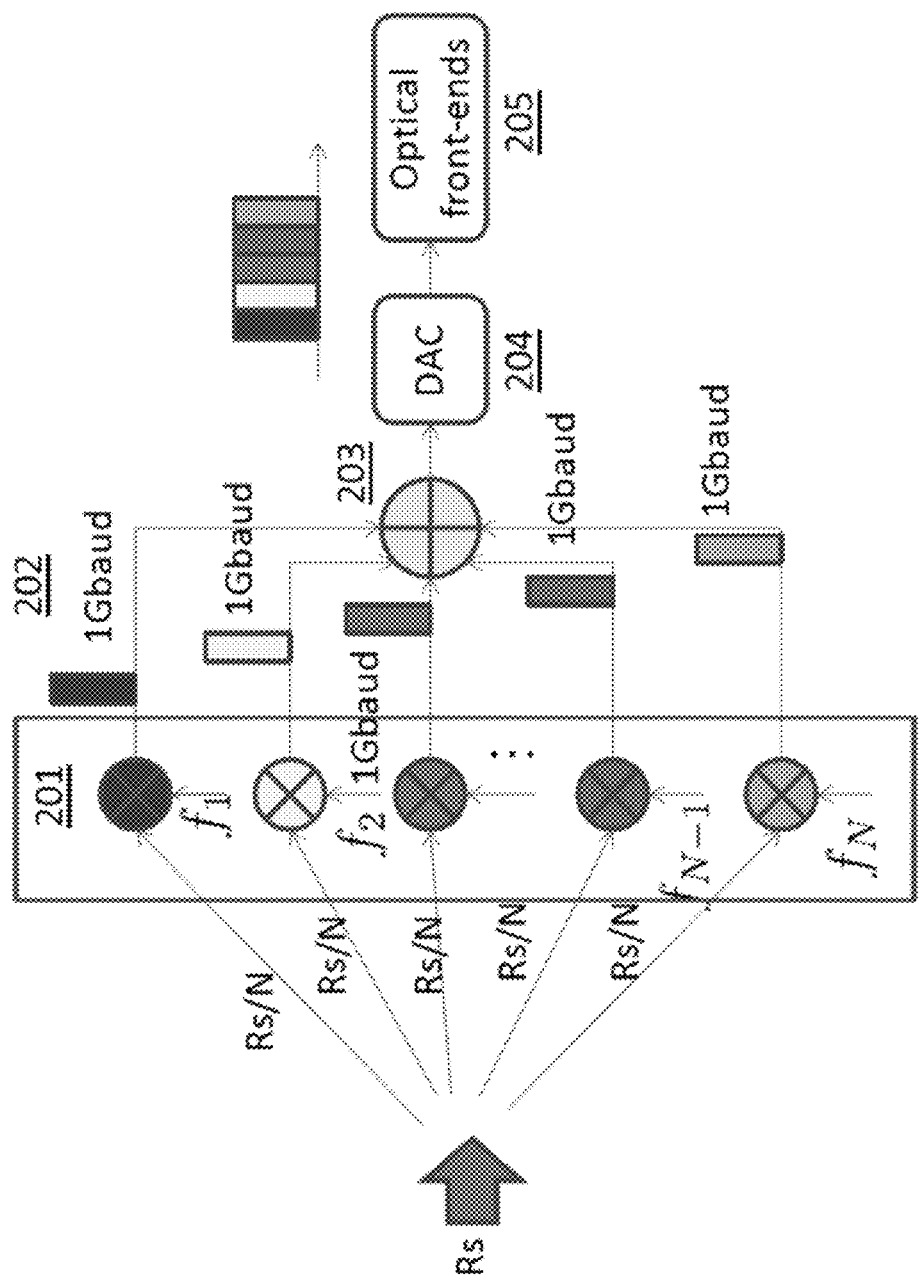
FIG. 5 shows an exemplary schematic block diagram of sub-band signal generation according to an aspect of the present disclosure.

As may be appreciated, a sub-banding approach according to the present disclosure ensures that sub-banding signals have the same data rate as 32 Gbaud by multiplexing 32 sub-bands 1 Gbaud signal together, which shares the same optical front-end as 32 Gbaud signal by using single digital-to-analog converter (DAC). With reference now to FIG. 5, there is shown an exemplary schematic block diagram of sub-band signal generation according to an aspect of the present disclosure. As may be observed, a higher-baud-rate signal at Rs baud is divided into N lanes to generate ~1 Gbaud signal, which is up-converted to its own assigned frequency through frequency multiplier (201). Each 1 Gbaud band (202) will be combined into single signal waveforms (203) and is converted into analog signals through single DAC (204). The analog waveforms will drive optical front-ends to produce optical signals. As may be learned from the illustration of FIG. 5, each band is independent of each other and can be individually demodulated at the receiver, which gives its advantage to mitigate the MPI accumulated from the QSM fiber.

Figure 6A:
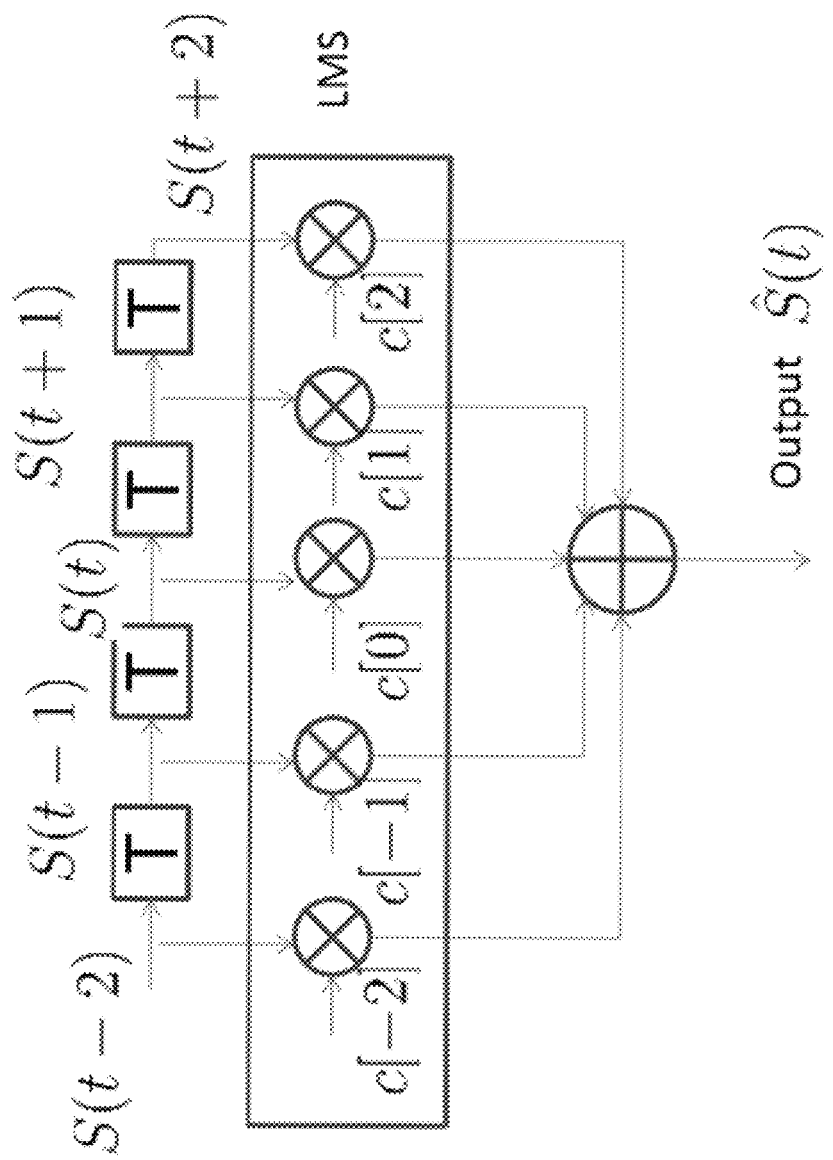
FIG. 6(a) shows a schematic of an LMS equalizer according to an aspect of the present disclosure.
Figure 6B:
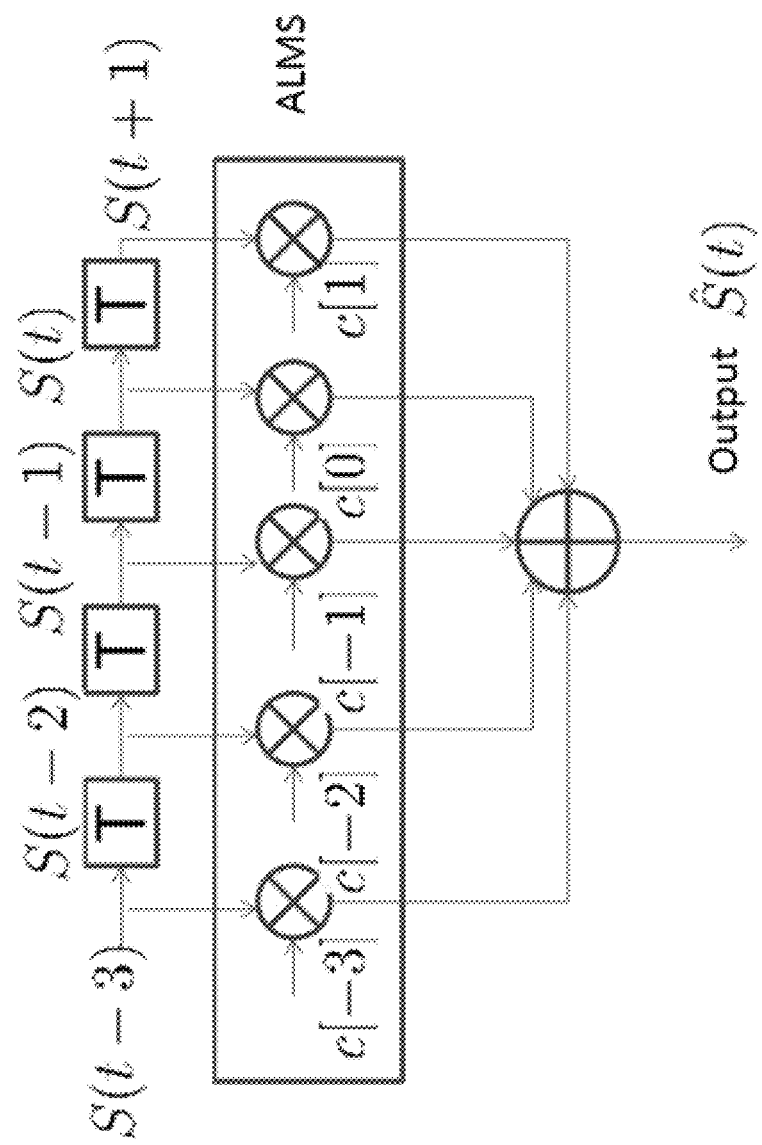
FIG. 6(b) shows a schematic of an ALMS equalizer according to an aspect of the present disclosure.
Figure 6C:
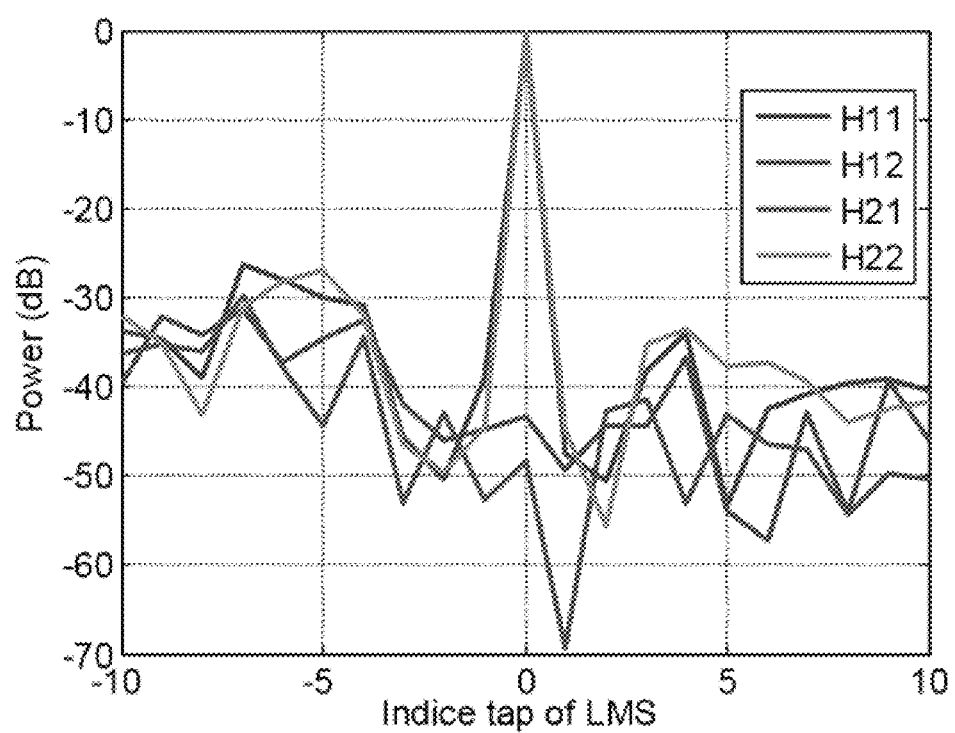
FIG. 6(c) shows a graph depicting the 21 tap coefficients according to an aspect of the present disclosure.
Figure 6D:
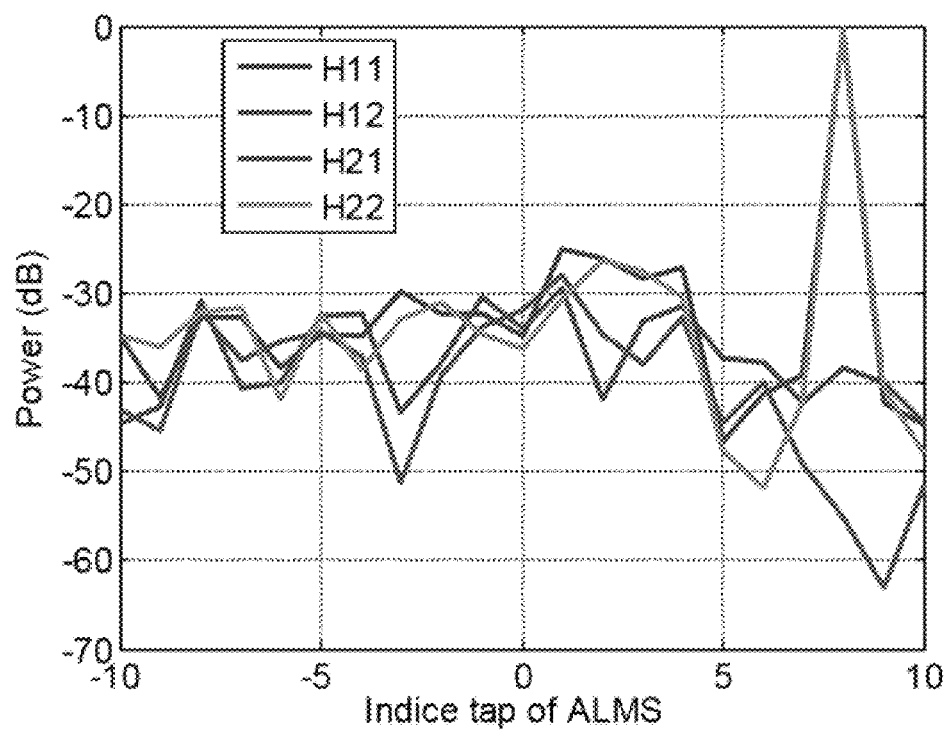
FIG. 6(d) shows a graph depicting the 21 tap coefficients according to an aspect of the present disclosure.

FIG. 6(a) shows a schematic of an LMS equalizer according to an aspect of the present disclosure. FIG. 6(b) shows a schematic of an ALMS equalizer according to an aspect of the present disclosure. FIG. 6(c) shows a graph depicting the 21 tap coefficients according to an aspect of the present disclosure. FIG. 6(d) shows a graph depicting the 21 tap coefficients according to an aspect of the present disclosure In the conventional LMS equalizer depicted in FIG. 6(a), the center tap c[0] is always placed in the middle of tap numbers, thereby equalizing the signal distortions attributed from both sides.

FIG. 6(c) depicts in graphical form the poser vs. indice tap of LMS wherein the 21-tap coefficients of LMS are shown, and the center tap has the largest weight than the other taps. However, as already shown from the graph of plotted in FIG. 2(b), the MPI can only come from left side of signal, i.e., the delayed copy of signal.

Figure 7:
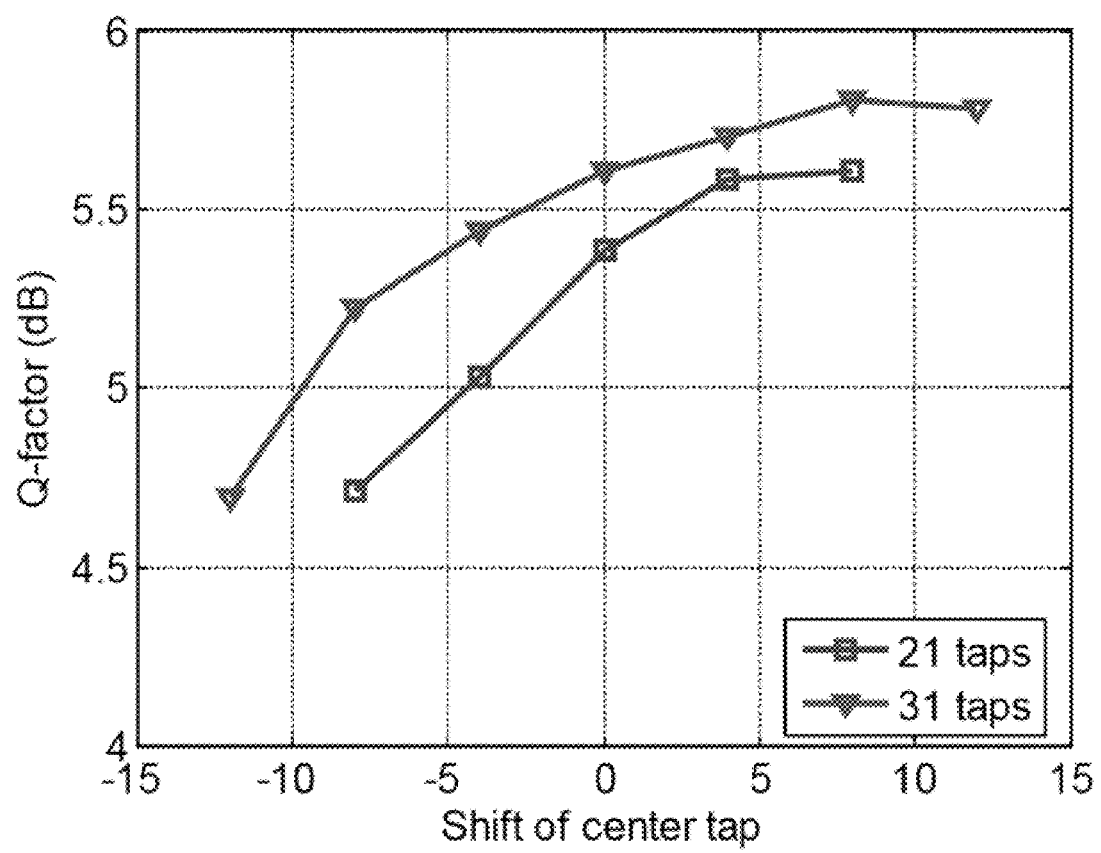
FIG. 7 is a graph showing the improvement of asymmetric least-mean square (ALMS) to compensate multi-path interference (MPI) after 4000 km transmission vs the position of the center tap when using 21 taps and 31 taps according to the present disclosure.

Turning now to FIG. 6(b), there is shown another aspect of the present disclosure namely an ALMS equalizer wherein the center tap has been shifted to the right-hand side because of MPI characteristic. In this manner, the compensation range of MPI would be wider than LMS algorithm and thus have better performance, as shown in FIG. 7.

Note that the LMS corresponds to the center tap located at zero. When the center tap of LMS is shifted by ~5 taps to the righthand side, the Q-factor of our ALMS techniques according to the present disclosure can improve 0.2 dB at the same number of taps. Even though increasing the number of taps to 31, the LMS can only perform as well as ALMS with 21 taps. When applying ALMS using 31 taps, we obtain similar improvement as 21 taps. The results here clearly show that the proposed ALMS could reduce the complexity of DSP by about ⅓ with using less number of equalizer taps.

Advantageously, one important aspect of methods and techniques according to the present disclosure is to utilize three techniques described herein together to improve the performance of QSM fiber without incurring much penalty from MPI. The usage of ALMS compensation and sub-banding signal helps to contain the number of equalizer taps to a manageable level, like ~100 taps, while the system still performs better than one configured with all-SMF/QSM spans because of larger effective area of QSM and reduced MPI from hybrid QSM/SMF configuration.

Experimental Background, Setup, Results and Discussion

As may be readily appreciated, high-speed optical systems generally rely solely on single-mode fibers for transmission distances greater than a few kilometers. By way of some additional recent background we note that there has recently been a renewed interest in transmission over few-mode fibers (FMFs) to increase the capacity over a single fiber strand by the multitude of the spatial modes [See, e.g., E. Ip et al, Proc. OFC'13, paper PDP5A.2 (2013)]. However, such an approach requires a radical transformation of optical communication infrastructure that is already built on the premise of transmission over a single spatial mode. Notwithstanding, it has been proposed that FMFs can be integrated into the otherwise single-mode infrastructure by transmitting only in the fundamental mode, while taking advantage of their significantly larger effective area [See, e.g., F. Yaman et al, Opt. Express, 18, 21342-21349 (2010); N. Bai et al., Opt. Express 20, 24010-24017 (2012)]. The feasibility of using FMFs was demonstrated in a recent transmission experiment over 2600 km [See, e.g., Q. Sui et al., Proc. OFC'14, Paper M3C.5 (2014)]. In this paper, 101.6-km-long hybrid spans consisting of low-loss silica-core FMFs and single-mode fibers are used to achieve a record spectral efficiency of 6.5 b/s/Hz in a standard unidirectional transmission configuration over the transoceanic distance of 6600 km using erbium-doped fiber amplifiers only.

To the best of our knowledge, this is the first time FMFs are used to outperform state-of-the-art single-mode fibers in a transoceanic transmission experiment. To make the FMFs compatible with single-mode transmission, single-mode fiber jumpers are spliced to each end. This excites only the fundamental mode of the FMF at launch, and also strips any high-order modes excited during transmission at the exit splice. Such systems may suffer from multi-path interference (MPI) even with inherently low mode coupling FMFs.

In effect, by using FMFs the nonlinear fiber impairments are traded for linear impairments from MPI which are easier to manage. While the improvements possible from mitigating nonlinear impairments by digital signal processing (DSP) is fundamentally limited in scope, and computationally costly, it was demonstrated recently that most of the penalty from the MPI can be mitigated with much less computational complexity by including an additional decision-directed least mean square (DD-LMS) based adaptive linear equalizer to the standard digital coherent signal processing blocks.

Notably, the differential modal group delay (DMGD) of a FMF can be of the order of 1 ns/km and the required number of taps in the DD-LMS equalizer may be several hundreds to thousands. However, adaptive feed-forward equalizers do not perform optimally when using large number of taps. In this work, instead of using standard single-carrier modulation (SCM), a novel digital multi-subcarrier modulation (MSCM) signal with 32 subcarriers at 1 GBaud is used to reduce the number of equalizer taps per subcarrier by more than an order of magnitude while increasing the temporal extent of MPI that can be mitigated.

To further reduce MPI, a hybrid FMF-single-mode fiber span design is used for the first time with the FMF at the beginning of the span to reduce nonlinearity, and the single-mode fiber at the end to avoid excessive MPI. Hybrid spans also reduce the DSP complexity as they have smaller modal group delay per span compared to all FMF spans.

Experimental Setup

Figure 8A:
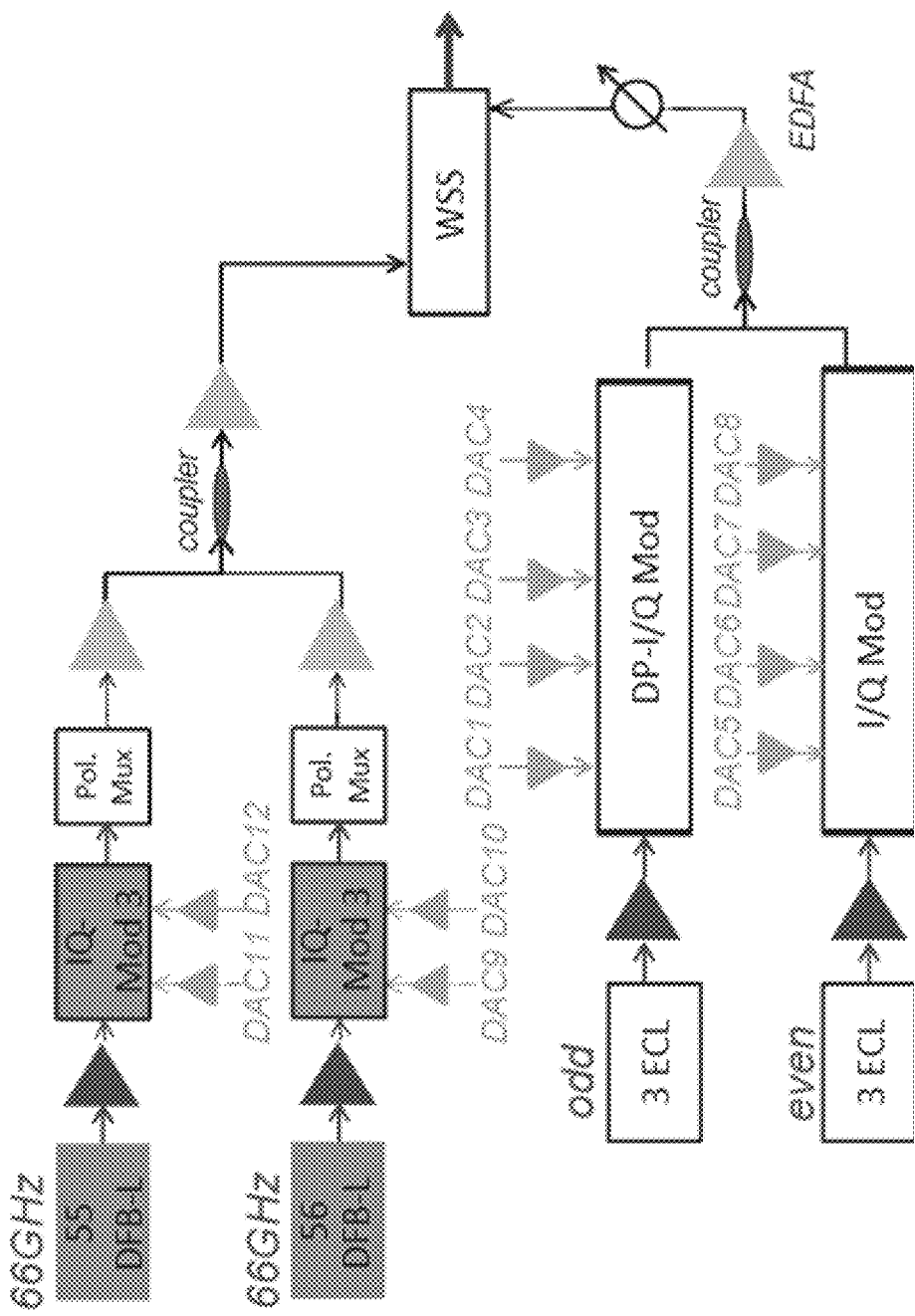
FIG. 8(a) shows in schematic form an illustrative experimental setup depicting a transmitter with six tunable channels and 111 loading channels modulated by 64 Gb/s DACs on a 33 Ghz grid according to an aspect of the present disclosure.

To evaluate configurations according to the present disclosure, an experimental setup as shown in FIG. 8(a) was employed. As may be observed from that setup shown in that Figure, at a transmitter side, digital-to-analog converters (DACs) with a sampling rate of 64 GHz are used to generate WDM channels tuned to a 33 GHz grid.

Notably, WDM channels are prepared in two groups. The first group includes of six neighboring channels generated with tunable external cavity lasers (ECLs). These six channels are tuned together across the C-band and only the center channel which uses a narrow linewidth (<1 kHz) is measured. The even and odd subgroups of the six tunable channels are modulated separately by 4 independent streams of data for all in-phase and quadrature (I/Q) rails in both polarizations.

The 111 loading channels are modulated with only independent I/Q rails followed by polarization multiplexing emulators. Tunable channels and dummy channels are combined through the effect of a wavelength selective switch (WSS) having a 1-GHz grid resolution.

Using the DACs, either a Nyquist-shaped single-carrier exhibiting a 32 GHz modulation rate or a multisubcarrier modulation with 32 1-GBaud subcarriers with 10 MHz guard-band are generated per wavelength.

The $2^{18}-1$ PRBS binary data are encoded by 16-ary irregular quasi-cyclic nonbinary LDPC encoder of girth 10 to generate codewords at three overheads (OHs), 14.3%, 20% and 25%, to maximize the capacity across C-band. The codeword length is 13680 for 14.3% and 20% OHs, and 74985 for 25% OH. Note that the encoder output is uniformly distributed into 32 sub-carriers for 16 QAM modulation.

Figure 8B:
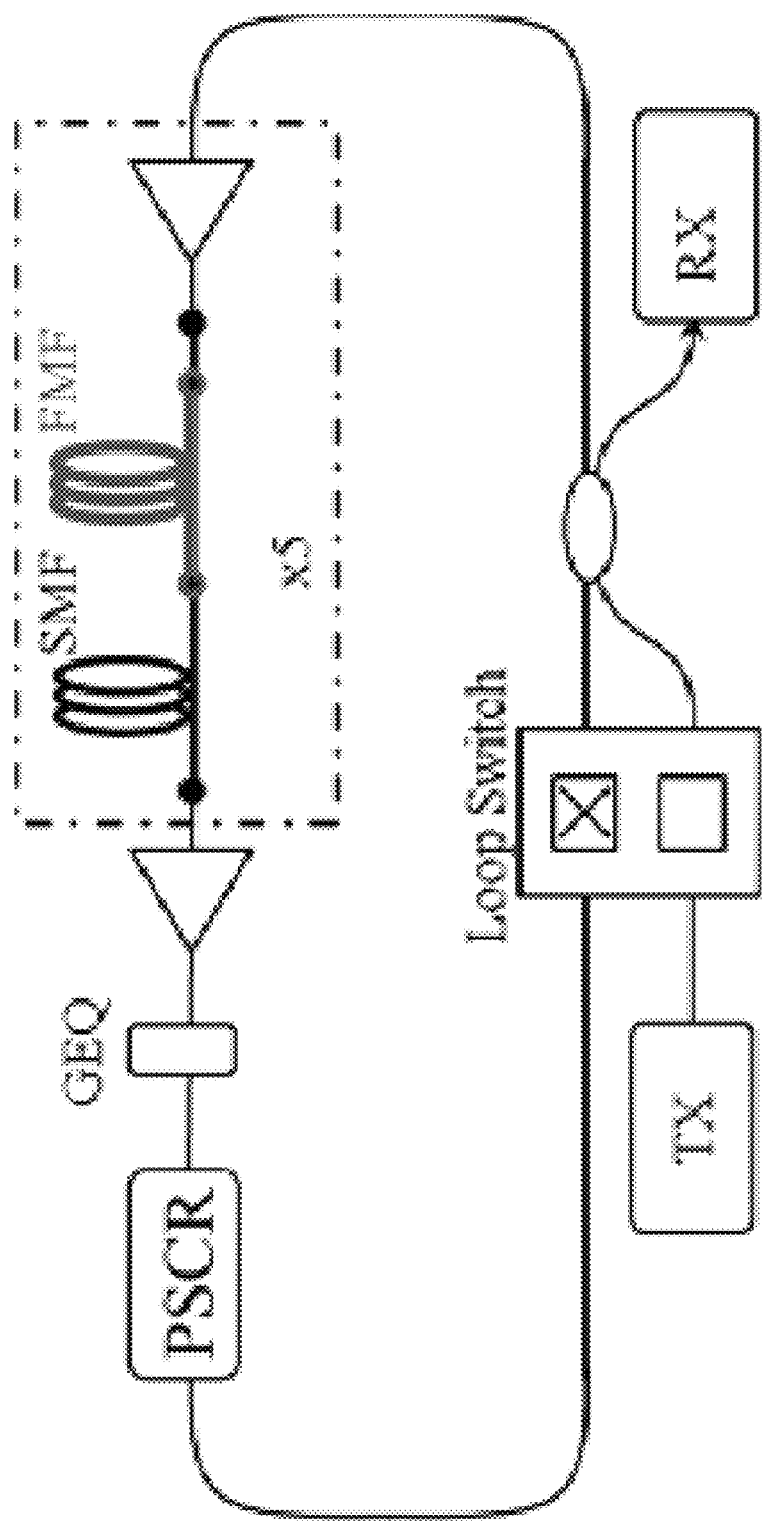
FIG. 8(b) shows in schematic form an illustrative experimental setup depicting a recirculating loop with 5 102 km long hybrid spans of FMF and Vascade EX3000 according to an aspect of the present disclosure.

A circulating loop test bed is shown schematically in FIG. 8(b) and includes five hybrid spans obtained by splicing 51.3-km-long FMFs with 50.3-km-long VASCADE® EX3000 fiber exhibiting average attenuations of 0.1568 dB/km, and 0.1534 dB/km, respectively. The FMFs support the LP11 mode albeit with a slightly higher attenuation and the differential modal delay is estimated to be 0.95 ns/km with the LP01 lagging. The effective areas of the single-mode fiber and the FMF portions are estimated to be 150 µm2 and about 200 µm2.

A short piece of VASCADE EX3000 is used as a bridge fiber between the FMF and the standard-single mode fiber pigtail of the EDFA output on the input side. The average span loss is 16.48 dB which corresponds to an additional 0.7 dB incurred by the 4 splices and the two connectors. The mid-band chromatic dispersion is approximately 21 ps/nm/km. Span loss is compensated by C-band erbium-doped fiber amplifiers (EDFAs). A WSS is used at the end of the loop to compensate the accumulated amplifier gain tilt.

At the receiver side, the WDM channel under test is filtered, and captured with a standard offline coherent receiver, using a low-phase noise laser with a linewidth less than 1 kHz as the local oscillator and a real-time 80 GSa/ssampling scope. In the case of a single-carrier signal, after resampling and correcting for chromatic dispersion the signal is fed into a multi-modulus algorithm for initial convergence of polarization de-multiplexing followed by carrier phase recovery. Subsequently a second stage of T-spaced equalizer using DD-LMS is applied to the 32 Gbaud SCM signal to mitigate MPI.

In the case of multi-subcarrier modulation, after resampling and chromatic dispersion compensation, each subcarrier is digitally filtered and processed individually in the same way as the single-carrier signal. The data of all subcarriers is combined and is further improved by the BCJR equalization [See, e.g, I. B. Djordjevic, J. Lightw. Technol. 31, 2969-2975 (2013)] and then sent to non-binary LDPC decoder for detecting post-FEC bit errors.

Experimental Results and Discussion

Figure 9:
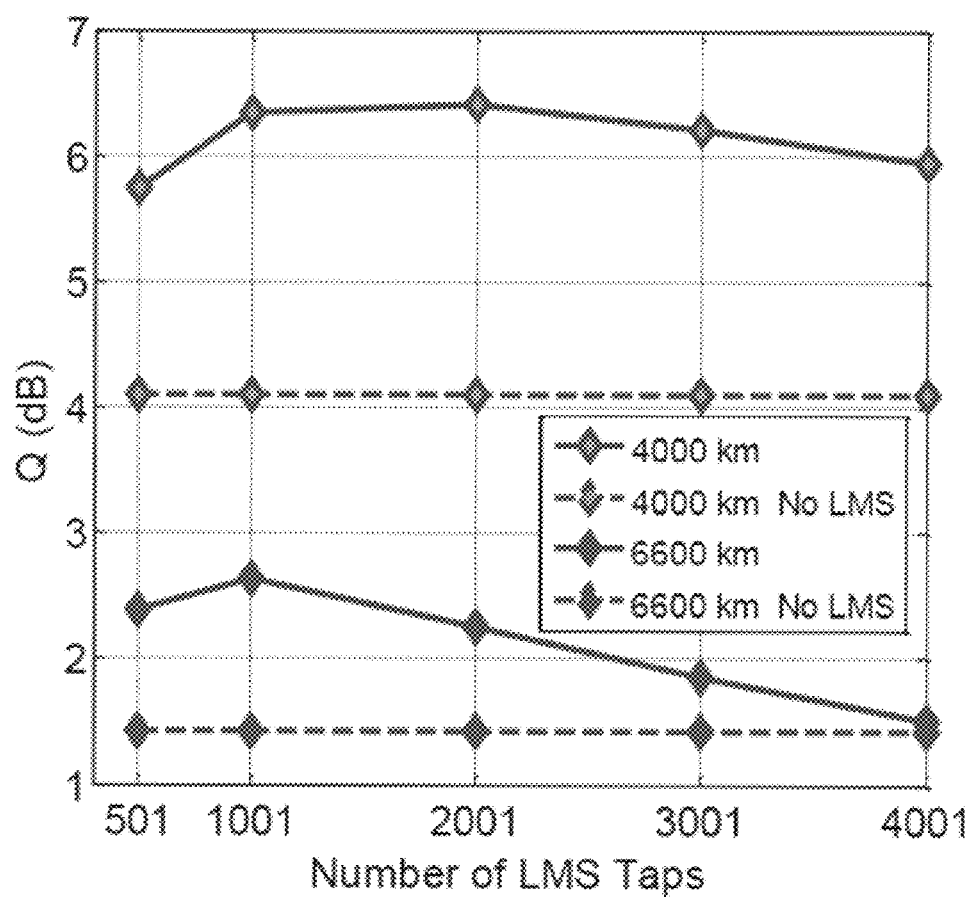
FIG. 9 shows a graph depicting Q vs number of LMS taps after 4060 km, and 6600 km for single carrier modulation according to an aspect of the present disclosure.

With reference to FIG. 9, it may be observed that Q-factor is plotted against number of LMS taps after 4060 km and 6600 km, at 1549.7 nm for the SCM case. Addition of LMS improves Q-factor by 2 dB at 4060 km by mitigating the MPI. Increasing the number of taps improves Q-factor initially as more of the MPI is mitigated, however, after 2001 taps the penalty associated with using large number of taps dominates.

Figure 10:
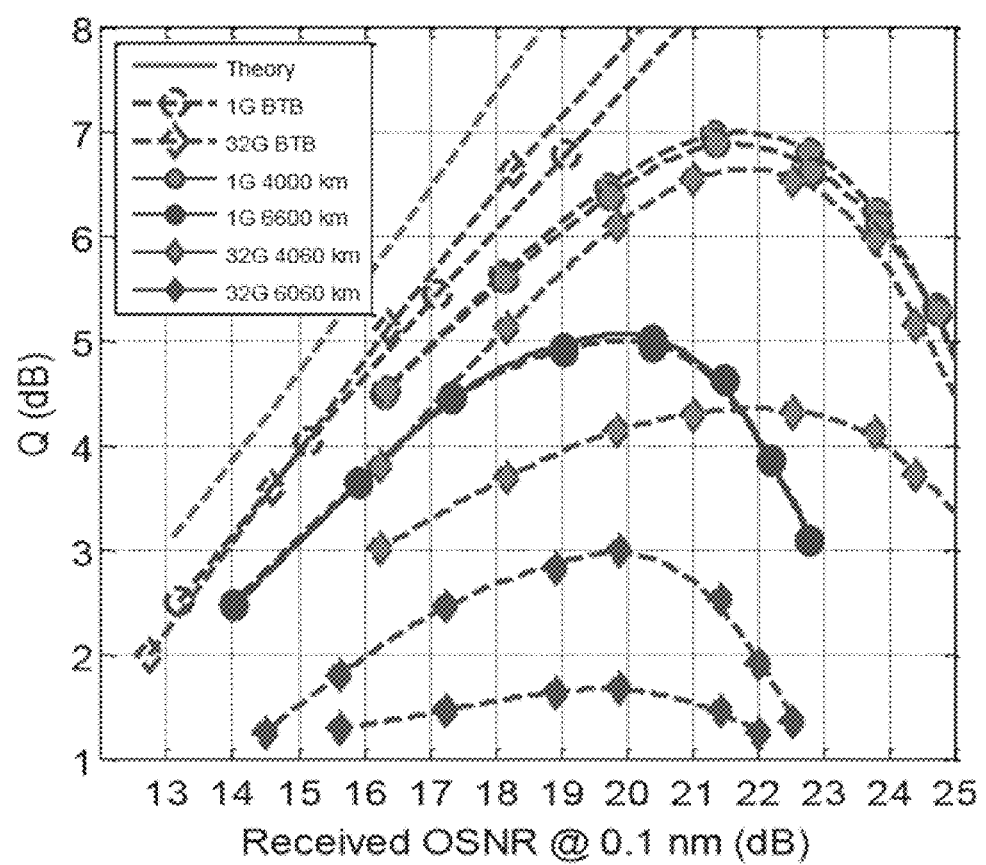
FIG. 10 shows a graph depicting Q vs received OSNR at 4060 km and 6600 km for multi-subcarrier and single-carrier modulations—dashed lines—no LMS—according to an aspect of the present disclosure.

FIG. 10 shows OSNR sensitivities for both 32 Gbaud DP16QAM SCM signals and 32×1 Gbaud MSM in back-to-back (BTB) noise loading configuration as well as after 4060 km and 6600 km transmission over the hybrid link. The received OSNR was varied by pre-emphasis of the six tunable channels at the transmitter with the measurement channel at 1549.7 nm. For the single-carrier case, a 41 tap CMA is used, followed by DD-LMS 1001 taps. For the MSCM signal, both CMA and the DD-LMS equalizers have 101 taps. In both configurations, the BTB sensitivity measurements show close to 1 dB implementation penalty. Even though SCM performs almost as well as the MSM at 4060 km it underperforms by 2 dB at 6600 km. Moreover, for MSCM signals, the CMA equalizer alone is sufficient to achieve optimal performance without the aid of LMS.

Figure 11:
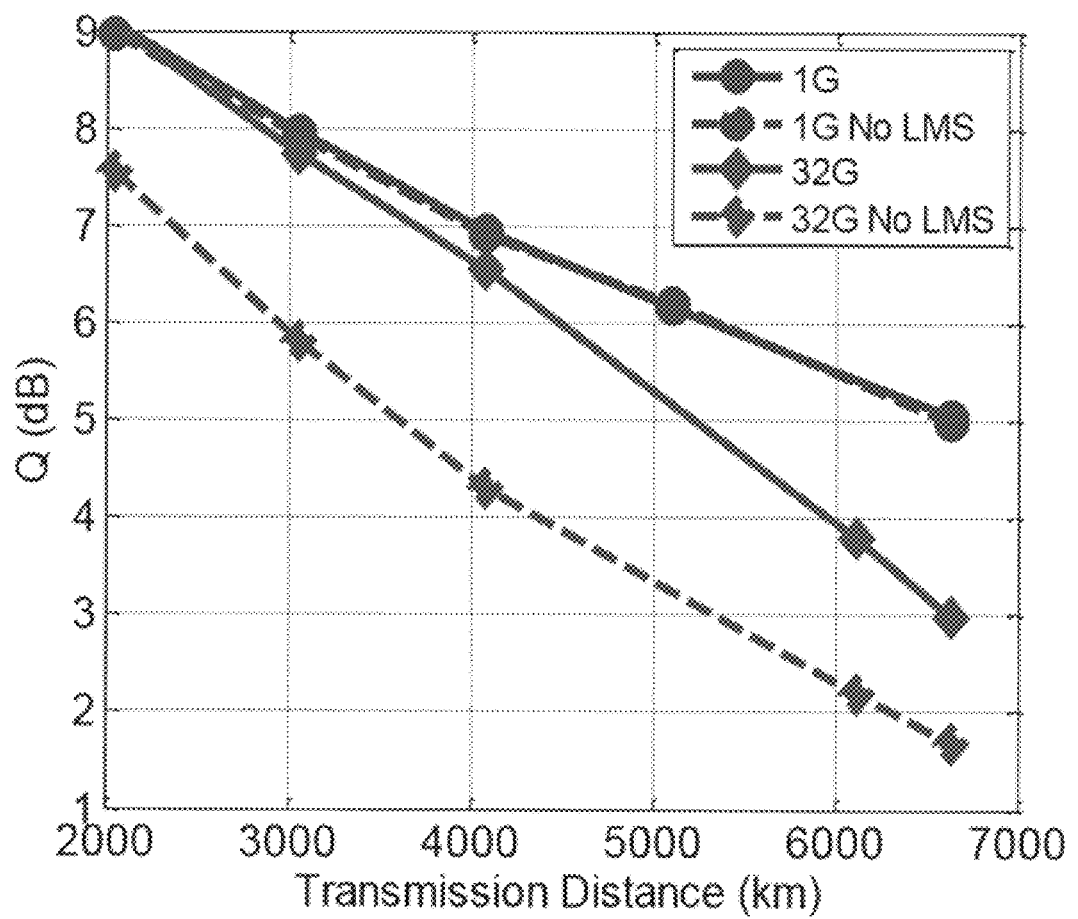
FIG. 11 shows a graph depicting Q-factor versus distance at 1549.7 nm with multi-subcarrier (blue) and single-carrier (red) modulation—dashed lines—without LMS—according to an aspect of the present disclosure.
Figure 12:
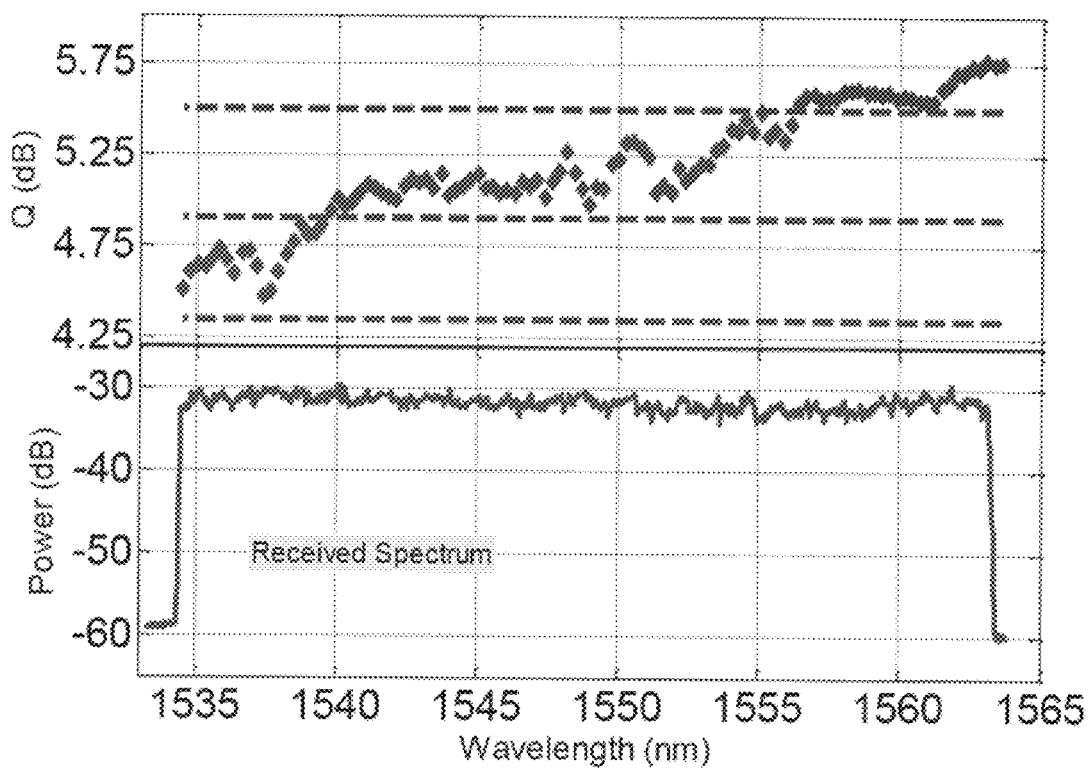
FIG. 12 shows a graph depicting measured transmission performance of 1559.36 nm with unidirectional and IBT schemes—insets—constellations after 1363 km and 6817 km according to an aspect of the present disclosure.
Figure 13:
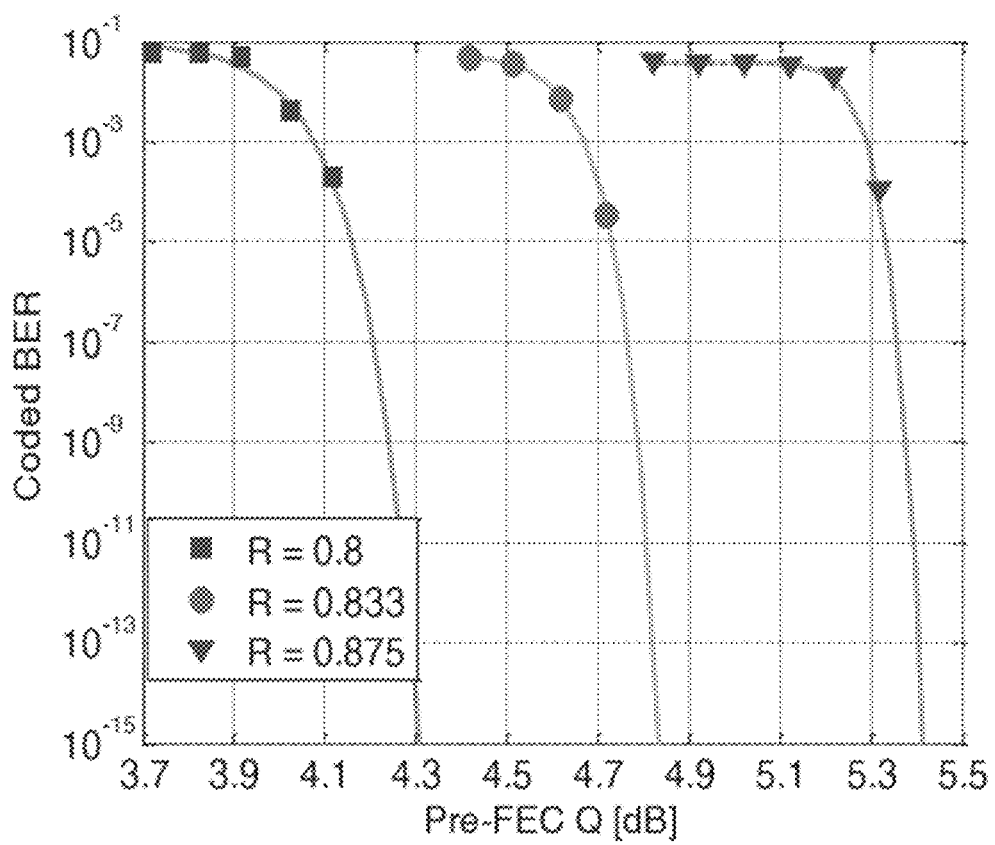
FIG. 13 shows a graph depicting back-to-back FEC coding performance according to an aspect of the present disclosure.

A comparison of the two modulation schemes at different distances are shown in FIG. 11. The Q-factor is measured across the C-band at 6600 km for a total of 111 WDM channels, from 1534.5 nm to 1563.6 nm. Q-factors averaged over 32 carriers, both polarizations, and over 10 separate measurements are plotted in FIG. 12 along with the received spectrum. The Q-factor varies from 4.5 dB to 5.7 dB from the shorter to the longer wavelengths. To maximize the capacity with such a variation of Q-factor three different FEC OHs at 14.3%, 20% and 25% are used for different portions of the C-band, as shown in FIG. 13.

Figure 14:
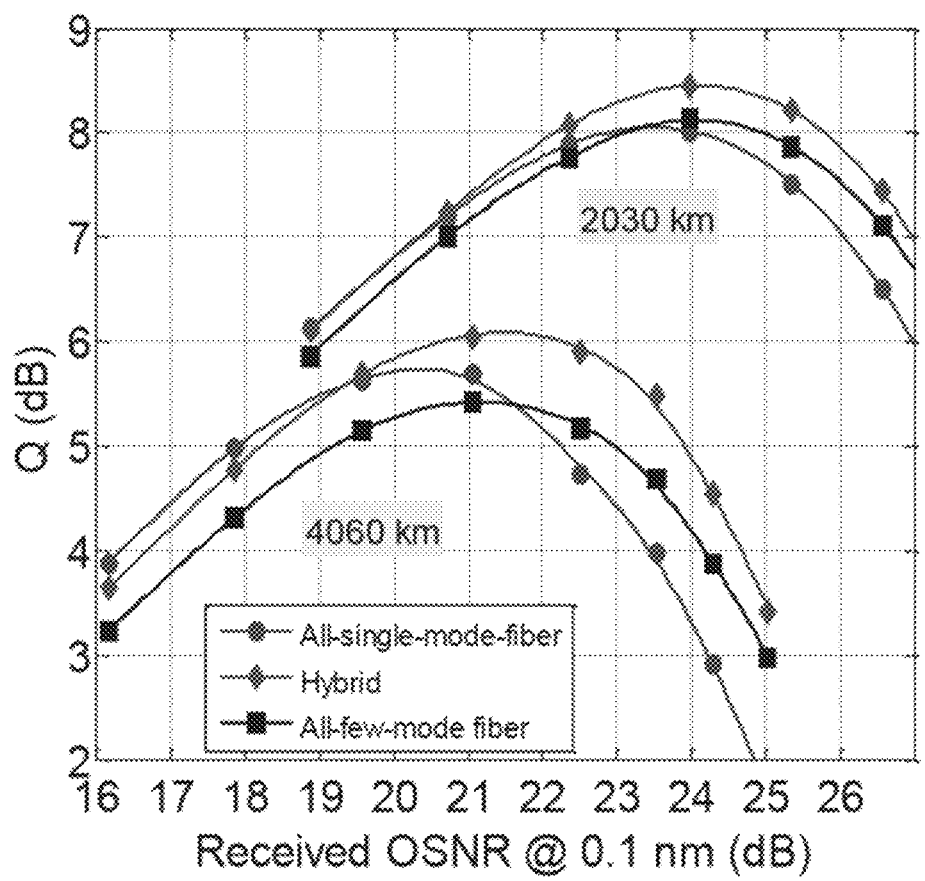
FIG. 14 shows a graph depicting Q-factor versus OSNR at 2030 km and 4060 km, all SMF, hybrid, and all-FMF according to an aspect of the present disclosure.

For each channel, more than 25 million bits were processed for LDPC decoding and all the channels were decoded errorfree in the LDPC decoder assisted with BCJR equalizer. The coding performance is further evaluated in the back-to-back (BTB) scenario as a function of pre-FEC Q-factor derived from bit-error counting as shown in FIG. 14. To achieve sufficient confidence level, over 100 million bits are considered for each BER point, and exponential fitting is used for extrapolating the measured BER data and thus estimating the FEC limit as 5.5 dB, 4.9 dB, and 4.35 dB Q-factor for 14.3%, 20% and 25% OH, respectively.

To make direct performance comparisons, we constructed three (3) comparable loops from: 1) all single-mode fiber, 2) all FMF, or 3) hybrid spans according to the present disclosure. Four of the hybrid spans are broken up and re-spliced to obtain either two spans of all-single-mode fiber spans or all-FMF spans with almost identical span lengths and losses. For the hybrid case three spans are removed from the loop.

Figure 15:
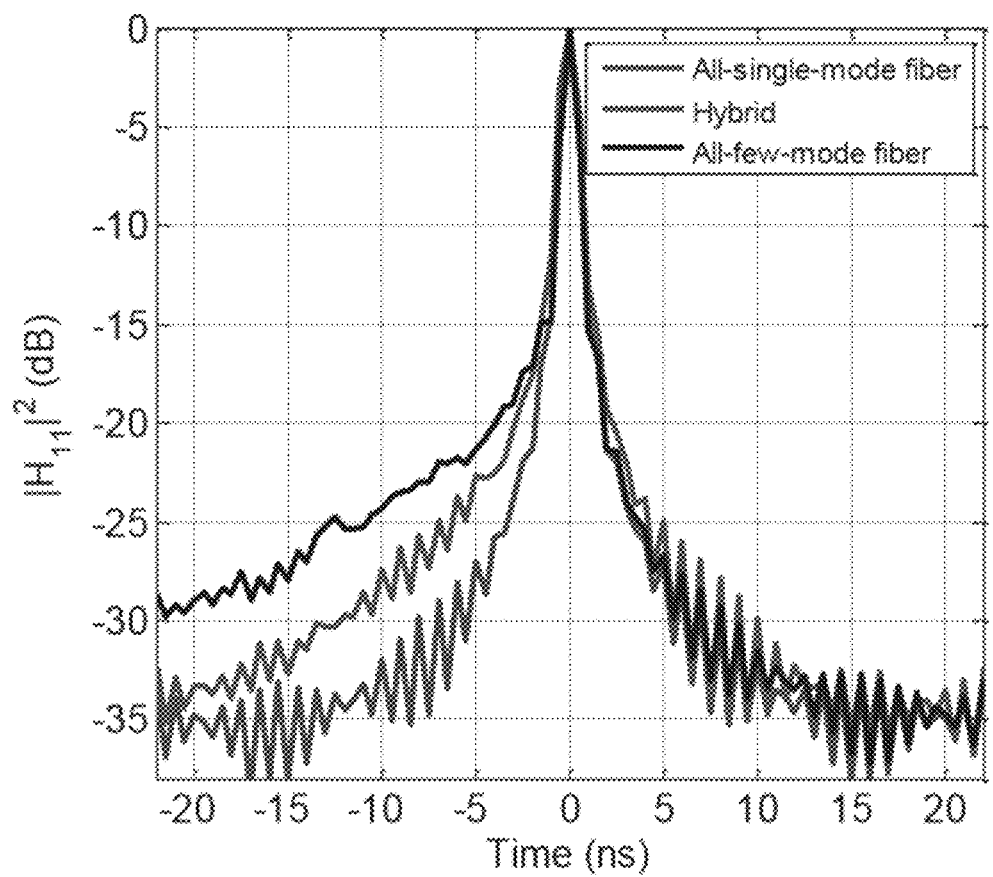
FIG. 15 shows a graph depicting CMA filter taps used to equalize signals after 2030 km for all-SMF, hybrid, and all-FMF links according to an aspect of the present disclosure.

FIG. 15 shows the comparison after 10 and 20 circulations using the same MSCM signals, and the same the receiver DSP with 101-tap long CMA, and no LMS. Because the FMFs have larger effective area, the optimum OSNR is larger by about 1 dB compared to the all-SMF case. However, some of this improvement is lost because the impact of MPI cannot be removed altogether which is more evident in portions of the curves dominated by the linear noise, especially when all-FMF spans are used. This is most clear at 4060 km in the low OSNR regime. However, for the hybrid span case, the nonlinear improvement from the large effective area more than compensates for the penalty due to residual MPI affording 0.4 dB improvement over the all-single-mode fiber configuration. The difference in the level of total MPI suffered by the hybrid, and all-FMF spans after 4060 km can be seen directly by observing the FIG. 8 shows the self-polarization component of the CMA equalizer filter taps used for all three span configurations after 4060 km. The leading portion of the equalizer filter is larger for the case of hybrid and all-FMF spans because of MPI. As expected, MPI is lower for hybrid spans compared to the all FMF, and at the same MPI level, all-FMF configuration would require larger number of taps.

A record spectral efficiency of 6.5 b/s/Hz is achieved over 6600 km in standard uni-directional transmission architecture by taking advantage of a hybrid span design consisting of large effective area FMF with low MPI, and VASCADE EX3000 single-mode fiber. Span lengths of 101.6-km were used with EDFA amplification only.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for mitigating multi-path interference (MPI) in a long-haul optical communications system comprising the steps of:
    configuring each fiber span of the system with a hybrid span of fiber, said hybrid span including a length of quasi-single-mode fiber (QSM) and a length of single-mode fiber (SMF) such that the overall fiber nonlinearity and MPI is reduced by at least half as compared to a link of QSM fiber over the same distance;
    configuring the system to include an Asymmetric Least-Mean Square (ALMS) equalizer wherein the ALMS equalizer operates to shift its center tap towards the right if a higher mode transmits slower than a fundamental mode else the center tap is shifted to the left such that the number of equalizer taps employed is reduced by at least ⅓ as compared to a standard Decision-Directed Least-Mean Square (DD-LMS) equalizer; and introducing a low-baudrate sub-banding signal into the system such that MPI is effectively compensated and a number of decision-directed least-mean square (DD-LMS) equalizer taps employed is reduced as compared with a high-baudrate signal.

2. A long-haul optical communications system for mitigating multi-path interference from quasi-single-mode fiber, the system comprising:

one or more hybrid fiber spans, each hybrid span including a length of quasi-single-mode fiber (QSM) and a length of single-mode fiber (SMF) such that the overall fiber nonlinearity and MPI is reduced by at least half as compared to a link of QSM fiber over the same distance;

an Asymmetric Least-Mean Square (ALMS) equalizer configured to operate to shift its center tap towards the right if a higher mode transmits slower than a fundamental mode else the center tap is shifted to the left such that the number of equalizer taps employed is reduced by at least $\frac{1}{3}$ as compared to a standard Decision-Directed Least-Mean Square (DD-LMS) equalizer; and a low-baudrate sub-banding signal injected into the system such that MPI is effectively compensated and a number of decision-directed least-mean square (DD-LMS) equalizer taps employed is reduced as compared with a high-baudrate signal.

* * * * *